United States Patent
Seletskiy et al.

(10) Patent No.: US 12,032,689 B2
(45) Date of Patent: *Jul. 9, 2024

(54) SYSTEMS AND METHODS FOR PREVENTING ZERO-DAY ATTACKS

(71) Applicant: Cloud Linux Software Inc., Estero, FL (US)

(72) Inventors: Igor Seletskiy, Palo Alto, CA (US); Serhii Brazhnyk, Odessa (UA)

(73) Assignee: Cloud Linux Software Inc., Estero, FL (US)

( * ) Notice: Subject to any disclaimer, the term of this patent is extended or adjusted under 35 U.S.C. 154(b) by 387 days.

This patent is subject to a terminal disclaimer.

(21) Appl. No.: 17/550,093

(22) Filed: Dec. 14, 2021

(65) Prior Publication Data
US 2023/0049789 A1    Feb. 16, 2023

Related U.S. Application Data (63) Continuation-in-part of application No. 17/389,523, filed on Jul. 30, 2021, now Pat. No. 11,599,637.

(51) Int. Cl.
*G06F 21/55* (2013.01)
*G06F 21/54* (2013.01)
(Continued)

(52) U.S. Cl.
CPC ............ *G06F 21/554* (2013.01); *G06F 21/54* (2013.01); *G06F 21/566* (2013.01); *G06F 21/577* (2013.01); *G06F 2221/033* (2013.01)

(58) Field of Classification Search
CPC ...... G06F 21/54; G06F 21/554; G06F 21/566; G06F 21/577; G06F 2221/033
See application file for complete search history.

(56) References Cited

U.S. PATENT DOCUMENTS 7,624,443 B2 * 11/2009 Kramer ................. G06F 21/554
                                                    709/224
8,201,244 B2 *  6/2012 Sun ....................... G06F 21/566
                                                    713/193
(Continued)

FOREIGN PATENT DOCUMENTS

EP          2610776 B1 *  8/2019  ............. G06F 21/56

OTHER PUBLICATIONS

H. Mahrous and B. Malhotra, "Managing Publicly Known Security Vulnerabilities in Software Systems," 2018 16th Annual Conference on Privacy, Security and Trust (PST), Belfast, Ireland, 2018, pp. 1-10, doi: 10.1109/PST.2018.8514187. (Year: 2018).*

(Continued)

*Primary Examiner* — Michael Simitoski
(74) *Attorney, Agent, or Firm* — ArentFox Schiff LLP; Michael Fainberg (57) ABSTRACT

Disclosed herein are systems and method for preventing zero-day attacks. A method may include receiving a first report including information about an execution of a first script of an application that modifies a file on a first computing device, and receiving a second report including an indication that the file includes malicious code. In response to determining that an identifier of the file is present in both the first report and the second report, the method may include generating and transmitting, to the first computing device, a first rule that prevents execution of any script that shares at least one operation of the first script. The method may include, in response to determining that a vulnerability detected by the first rule is not present in a vulnerability database, generating an entry in the vulnerability database for the vulnerability as a zero-day vulnerability and transmitting an alert to the application developer.

20 Claims, 8 Drawing Sheets

(51) Int. Cl.
*G06F 21/56* (2013.01)
*G06F 21/57* (2013.01)

(56) References Cited

U.S. PATENT DOCUMENTS

| | | | | |
|---|---|---|---|---|
| 9,158,915 | B1* | 10/2015 | Yumer | G06F 21/552 |
| 9,813,443 | B1* | 11/2017 | Subramanian | G06F 21/561 |
| 10,581,888 | B1* | 3/2020 | Agranonik | H04L 63/1466 |
| 11,436,327 | B1* | 9/2022 | Vashisht | G06F 21/565 |
| 2006/0004614 | A1* | 1/2006 | Hutchinson | G06Q 10/10 717/102 |
| 2007/0271301 | A1* | 11/2007 | Klive | G06F 16/29 |
| 2008/0127336 | A1* | 5/2008 | Sun | G06F 21/566 726/22 |
| 2009/0044024 | A1* | 2/2009 | Oberheide | H04L 63/145 713/188 |
| 2009/0089879 | A1* | 4/2009 | Wang | G06F 21/53 726/24 |
| 2011/0083176 | A1* | 4/2011 | Martynenko | G06F 21/56 726/13 |
| 2015/0381650 | A1* | 12/2015 | Kaplan | H04L 63/1433 726/25 |
| 2016/0359896 | A1* | 12/2016 | Hay | H04L 63/1425 |
| 2017/0041338 | A1* | 2/2017 | Martini | H04L 63/1416 |
| 2017/0300698 | A1* | 10/2017 | Chawla | G06F 21/577 |
| 2017/0329968 | A1* | 11/2017 | Wachdorf | G06F 21/566 |
| 2017/0357809 | A1* | 12/2017 | Smith | G06Q 10/06398 |
| 2018/0075245 | A1* | 3/2018 | Tripp | G06F 21/577 |
| 2019/0018960 | A1* | 1/2019 | Chistyakov | G06F 21/57 |
| 2019/0065744 | A1* | 2/2019 | Gaustad | G06F 21/562 |
| 2019/0370471 | A1* | 12/2019 | Petratos | G06F 8/71 |

OTHER PUBLICATIONS

G. Siewruk and W. Mazurczyk, "Context-Aware Software Vulnerability Classification Using Machine Learning," in IEEE Access, vol. 9, pp. 88852-88867, 2021, doi: 10.1109/ACCESS.2021.3075385. (Year: 2021).*

* cited by examiner

SYSTEMS AND METHODS FOR PREVENTING ZERO-DAY ATTACKS

CROSS-REFERENCE TO RELATED APPLICATIONS

This application is a continuation-in-part and claims the benefit of U.S. Non-Provisional application Ser. No. 17/389,523 filed Jul. 30, 2021, which is herein incorporated by reference.

FIELD OF TECHNOLOGY

The present disclosure relates to the field of data security, and, more specifically, to systems and methods for preventing zero-day attacks.

BACKGROUND

Anti-virus and malware scanners often detect malicious activity once it has already occurred. At this point, the damage caused by the malicious entity has happened and may be irreversible. In some cases, a script that seems benign may be executed, thus generating a malicious file, and the scanner will be unable to prevent the execution (because the script does not appear malicious). The malicious file may then proceed to harm the computing device.

This reactive approach is even more deadly for zero-day vulnerabilities. A zero-day attack may occur when a security flaw exists in application, but the developers of the application are not aware of the flaw. A hacker may discover the flaw and exploit it using a malicious injection. A cyberattack of this kind may result in loss of functionality, data loss/theft, etc. Because the developers are unaware of the flaw, the issue may remain until a patch is introduced. The time it takes to produce the patch and distribute the patch may be too long and the lack of protection by malware scanners may enable the cyberattack to spread to other devices where the application is installed.

Because conventional data security systems are reactive and do not prevent malicious executions, computing devices are still at risk of harm. There thus exists a need for the proactive blocking of malicious script executions—specifically for zero-day exploits.

SUMMARY

Aspects of the disclosure relate to the field of data security. In particular, aspects of the disclosure describe methods and systems for preventing zero-day attacks.

In some aspects, the techniques described herein relate to a method for preventing zero-day attacks, the method including: receiving a first report including information about an execution of a first script on a first computing device, wherein the first script creates or modifies a file on the first computing device and wherein the first report includes a first list of operations involved in the execution of the first script, an identifier of the first script, and an identifier of the file; receiving a second report including an indication that the file includes malicious code and the identifier of the file; in response to determining that identifier of the file is present in both the first report and the second report, generating and transmitting, to the first computing device, a first rule that prevents execution of any script that shares at least one operation in the first list of operations with the first script; identifying, on the first computing device, an application that includes the first script; determining whether a vulnerability detected by the first rule is present in a vulnerability database; in response to determining that the vulnerability is not present in the vulnerability database, generating an entry in the vulnerability database for the vulnerability as a zero-day vulnerability; and transmitting an alert to a developer of the application reporting the zero-day vulnerability.

In some aspects, the techniques described herein relate to a method, wherein the alert requests a patch to fix the zero-day vulnerability.

In some aspects, the techniques described herein relate to a method, further including: receiving, from the developer, the patch that resolves the zero-day vulnerability in the application; updating the entry in the vulnerability database to indicate a version identifier of the application that resolves the zero-day vulnerability.

In some aspects, the techniques described herein relate to a method, further including: identifying a version of the application; determining whether the version is a latest version of the application; in response to determining that the version is not the latest version, determining whether the zero-day vulnerability is present in the latest version of the application; and in response to determining that the zero-day vulnerability is not present in the latest version, transmitting an alert to the first computing device to install the latest version of the application.

In some aspects, the techniques described herein relate to a method, wherein determining whether the zero-day vulnerability is present in the latest version includes: determining whether the zero-day vulnerability is detected using the first rule on the latest version of the application.

In some aspects, the techniques described herein relate to a method, further including: in response to determining that the vulnerability is present in the vulnerability database, identifying a version of the application installed on the first computing device; and in response to determining that the vulnerability database indicates that the version of the application resolves the vulnerability, transmitting an alert to the developer of the application indicating that the vulnerability has not been resolved in the version.

In some aspects, the techniques described herein relate to a method, further including: in response to determining that the vulnerability database indicates that the version of the application does not resolve the vulnerability, identifying a newer version of the application that does not have the vulnerability; and transmitting an alert to the first computing device to install the newer version of the application.

In some aspects, the techniques described herein relate to a method, further including: transmitting the first rule to a plurality of computing devices including the first computing device; monitoring an amount of times the vulnerability is detected using the first rule across the plurality of computing devices; wherein transmitting the alert to the developer of the application reporting the zero-day vulnerability is in response to determining that the amount of times exceeds a threshold vulnerability count.

In some aspects, the techniques described herein relate to a method, wherein the first computing device is configured to block, based on the first rule, complete execution of scripts that involve at least one operation in the first list of operations on the first computing device.

In some aspects, the techniques described herein relate to a method, wherein the first script is a PHP script.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for blocking malicious script execution. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
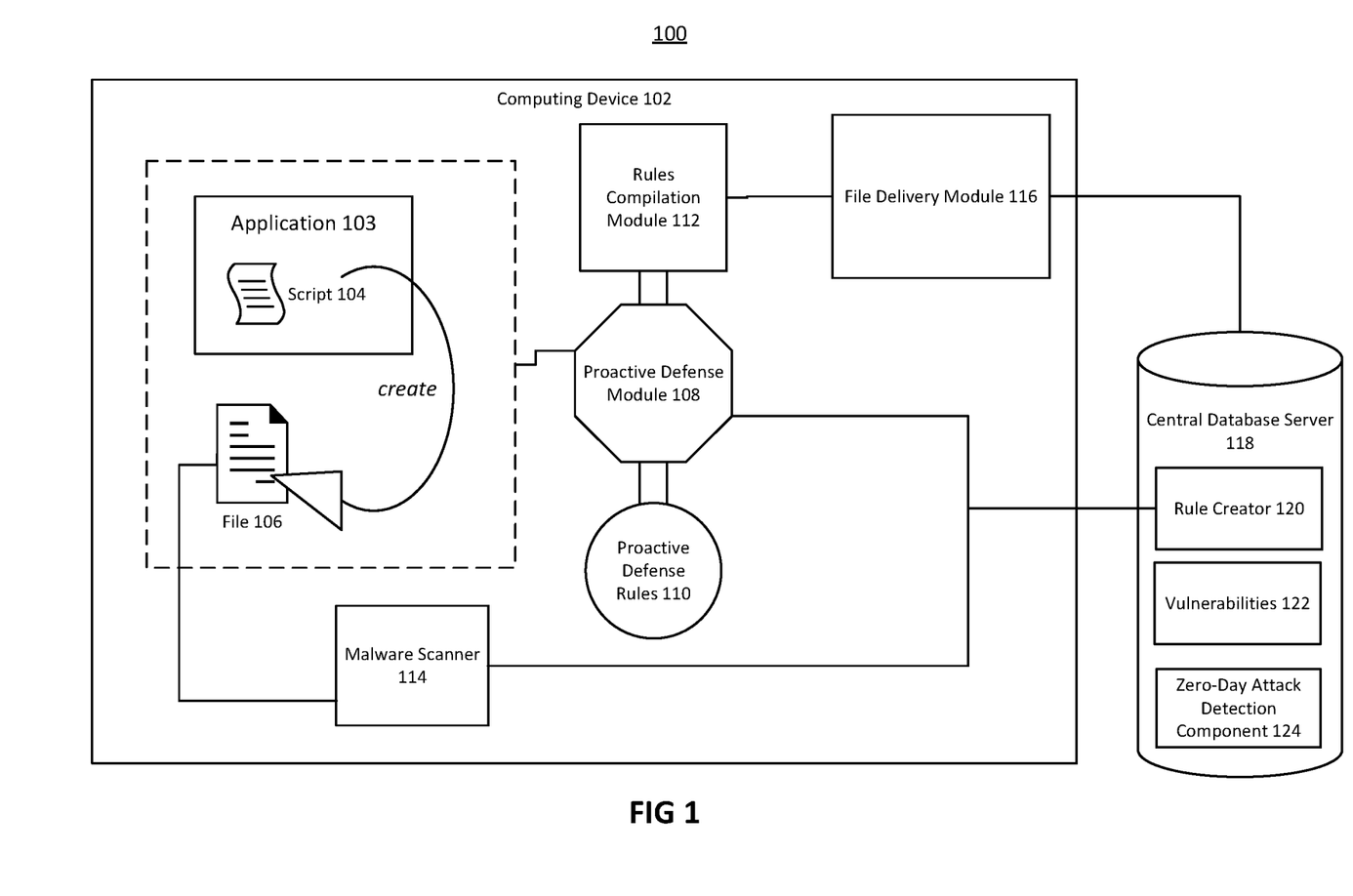
FIG. 1 is a block diagram illustrating a system for blocking malicious script execution and preventing zero-day attacks.

FIG. 1 is a block diagram illustrating system 100 for blocking malicious script execution and preventing zero-day attacks. Computing device 102 may be a computer, a laptop, a server, or any other device that can be targeted by malware. Stored in the memory of computing device 102 may be a script 104 that creates a malicious file 106. In some aspects, this creation may involve modifying an existing file (e.g., using an injection) to become file 106. It should be noted that because file 106 is malicious, script 104 is also malicious. However, a conventional security system may be unable to detect the maliciousness of script 104 and thus allow for its execution.

Computing device 102 includes proactive defense module 108, which is a binary program that stops the execution of scripts that harm computing device 102 (e.g., script 104). In some aspects, proactive defense module 108 is embedded in PHP. Proactive defense module 108 tracks active file operations (e.g., write, create) made by a script on computing device 102 and compares them against proactive defense rules 110, which is a database of signatures associated with malicious activity. All rules are made such that if a signature is detected, the execution of the associated script should be blocked. Suppose that a file operation of script 104 matches an operation in proactive defense rules 110 that should be blocked. In response to detecting the match, proactive defense module 108 blocks the operation. For example, proactive defense module 108 may prevent the creation of malicious file 106 by blocking the execution of script 104 in response to detecting that a signature of script 104 is found in proactive defense rules 110.

Determining whether to block complete execution of a script depends on whether the sequence of file operations is recognized by proactive defense module 108. In some cases, a script 104 may be novel malware that proactive defense module 108 cannot block because a blocking rule identifying the signature of script 104 does not exist in rules 110. In order to learn new operation sequences to block, proactive defense module 108 works in conjunction with malware scanner 114. Malware scanner 114 may be a utility that analyzes files for the presence of malicious code. The analysis is made by periodically scanning files such as script 104 and file 106 on computing device 102.

Proactive defense module 108 collects information about active operations associated with script 104 and transmits the information to central database server 118. Similarly, in response to detecting the presence of malicious activity, malware scanner 114 transmits information about the malicious activity to central database server 118. Central database server 118 is a server and software complex that stores and organizes the received data. In some aspects, a portion of the data in central database server 118 may be stored locally on computing device 102.

Rules creator 120 is a module that aligns the information sent by both malware scanner 114 and proactive defense module 108. For example, based on timestamps and the name of the malicious file, rule creator 120 may determine that the malicious file 106 is associated with the active operations of script 104. Rules creator 120 may generate a rule in text form that indicates that the active operations of script 104 should be blocked. Central database server 118 transmits the rule back to file delivery module 116 for delivery to computing device 102. File delivery system 116 is a program that delivers files and information between computing device 102 and central database server 118. Rules compilation module 112 is configured to convert the received rule from plain text format to the binary format understandable by proactive defense module 108. The converted rule is stored alongside rules 110 in the memory of computing device 102. Rules 110 is thus periodically updated with new signature-based rules that indicate operations associated with malicious activity.

In some aspects, malware scanner 114, proactive defense module 108, and rules compilation module 112 are thin client applications and their thick client application counterparts may be stored on a remote server. For example, the thin client applications of malware scanner 114 and proactive defense module 108 may generate a copy of script 104 and transmit it to the remote server. The thick client applications on remote server may generate reports about malicious code detection and execution flows and transmit the reports to central database server 118, which may also be stored on a remote server. In some aspects, malware scanner 114 is a third-party antivirus application that does not communicate with proactive defense module 108.

In an exemplary aspect, central database server 118 includes zero-day attack detection component 124 and vulnerabilities 122. Suppose that script 104 is a part of application 103. Subsequent to a rule being generated as a part of proactive defense rules 110, zero-day attack detection component 124 determines whether the vulnerability in application 103 is a zero-day vulnerability. In particular, zero-day attack detection component 124 determines a version of the application (e.g., version 1.0, version 1.2 (after a patch), etc.). This may be determined based on the metadata of the application that lists configuration details associated with the application. The metadata may include a time of installation, a time of access, size, extension, a version identifier, etc.

Vulnerabilities 122 may be a data structure (e.g., a two-dimensional array) that identifies applications, their versions, and the vulnerabilities for each version. For example, the data structure may be organized as such:

| Application | Version | Vulnerability | Fixed |
|---|---|---|---|
| XYZ | 1.11 | Injection: fwrite to file 106 | 1.12 |
| XYZ | 1.11 | Injection: fwrite to file ABC | 1.12 |
| XYZ | 1.12 | — | — |

According to this data structure, which only includes three entries for simplicity (one skilled in the art will appreciate that the table can have any number of entries for different applications, versions, and vulnerabilities) application "XYZ" has two versions: 1.11 and 1.12. There are two known vulnerabilities in version 1.11. For example, there may be instances where a malware injection included an fwrite function and made changes to file 106 and file ABC. In some aspects, vulnerabilities 122 data structure may also include a fixed column that indicates when the vulnerability was fixed. For example, the two vulnerabilities of version 1.11 may be fixed in version 1.12 of application XYZ (i.e., version 1.12 may prevent the fwrite command from executing or may be restructure the code to prevent the specific fwrite command from changing any files). According to the data structure, version 1.12 is the latest version of application XYZ and does not have any known vulnerabilities.

In some aspects, vulnerabilities 122 is populated by a developer of an application. For example, whenever a developer identifies a vulnerability, the developer may add information about it in vulnerabilities 122 by communicating with central database server 118. In another aspect, zero-day attack detection component 124 populates vulnerabilities 122. For example, whenever a patch file is released by a developer and the patch file indicates all of the security issues resolved, zero-day attack detection component 124 may list the security issues of the previous version and indicate that the vulnerabilities added have been fixed in the latest version of the application.

As discussed previously, a developer may not be aware of a zero-day vulnerability. Such a vulnerability may be exploited by a hacker and rule creator 120 may detect the exploit by correlating information from both the proactive defense module 108 and malware scanner 114. In some aspects, zero-day attack detection component 124 filters out detections which have dropper scripts related to plugins (e.g., for WordPress, any script within the "wp-content/plugins" folder).

Zero-day attack detection component 124 may further determine whether the vulnerability associated with the signature is present in vulnerabilities 122. In response to determining that the vulnerability is not present in the data structure, zero-day attack detection component 124 may identify the vulnerability as a zero-day vulnerability. In contrast, if zero-day attack detection component 124 finds the vulnerability in vulnerabilities 122, zero-day attack detection component 124 may identify the vulnerability as an unprotected vulnerability or a known vulnerability. This is further discussed in FIG. 7.

Figure 2:
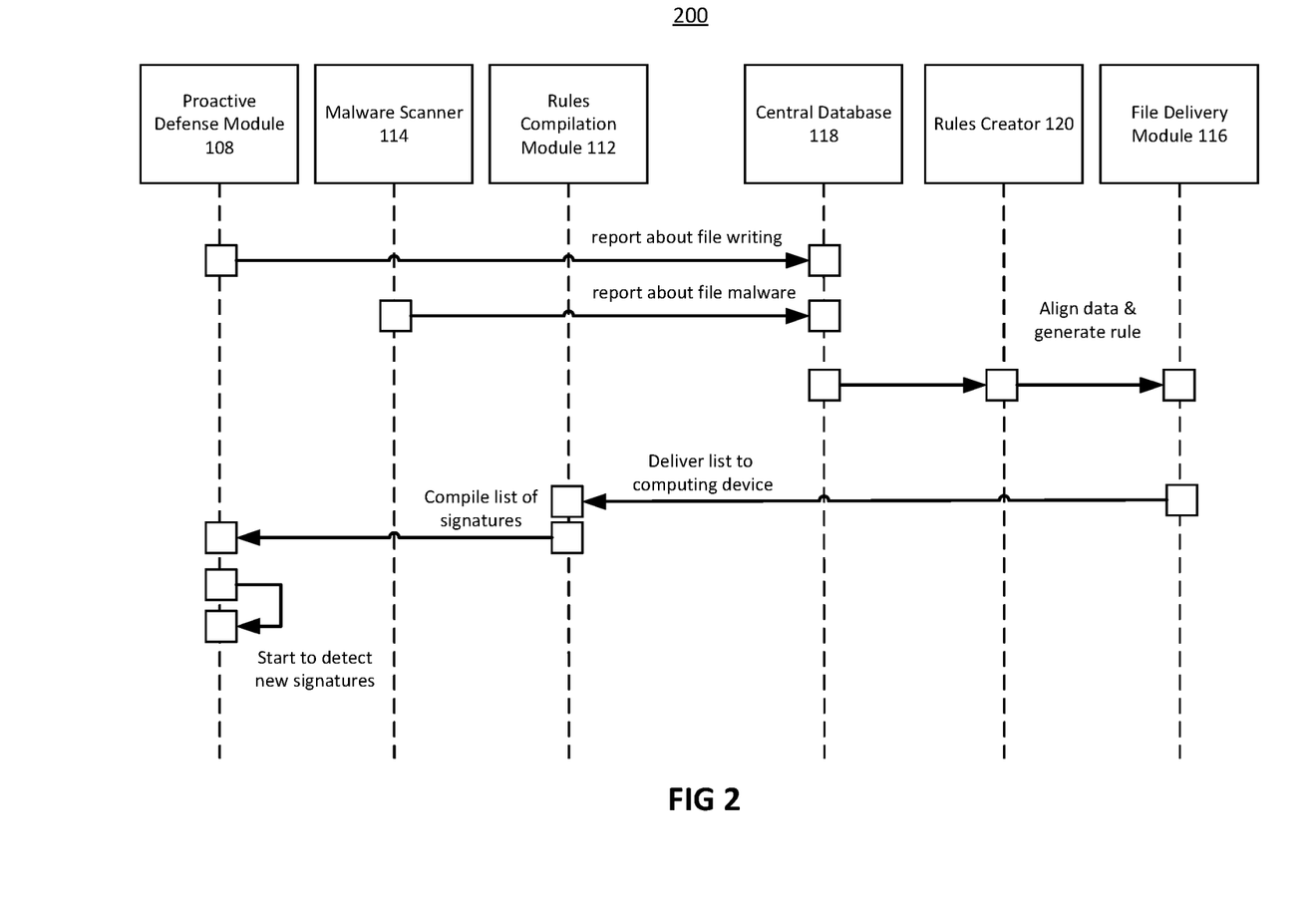
FIG. 2 is a flow diagram illustrating a method for updating defense rules.

FIG. 2 is a flow diagram illustrating method 200 for updating defense rules. Suppose that proactive defense module 108 is monitoring script 104. Proactive defense module 108 may write a queue of operations part of the execution flow in the form of a string array. For example, the array may be:

| f | a10,20 | b | s | s | a100,1 | f | e | s | a1,1 |
|---|---|---|---|---|---|---|---|---|---|

The letters above represent different operations. For example, in a PHP execution flow, a YAML file of proactive defense module 108 may include the following mappings between different characters and PHP functions:

```
- e: exec
...
- e: popen
- u: include
...
- u: curl_exec
- u: curl_multi_exec
- f: file_get_contents
- f: file_put_contents
- f: fopen
- f: fwrite
- f: symlink
- f: move_uploaded_file
- s: preg_replace
- s: trim
- s: str_replace
- s: rawurldecode
...
- h: register_shutdown_function
- i: register_tick_function
...
- y: set_exception_handler
- v: openssl_decrypt
- w: strrev
- x: gzuncompress
```

For example, "f" represents a group of PHP functions that work with files: fopen, fwrite, file_put_content, etc. "s" represents PHP functions working with strings: str_replace, trim, preg_replace, etc. "a" represents any other operation followed by the number of types of these operations and number of these operations.

When proactive defense module 108 records the operations or when file 106 is created by script 104, proactive defense module 108 sends a report to central database server 118 that includes the string array and information about script 104. For example, the information may include an identifier (e.g., name, extension, size, etc.) of file 106 that is being created or modified, an identifier of script 104 that is being executed and that creates or modifies file 106, and a time of occurrence of each operation in the string array.

Malware scanner 114 has an extensive list of malware signatures and the ability to replenish the list quickly. At the moment of detecting such a file with malicious code (e.g., file 106), scanner 114 also sends a report to central database server 118 including an identifier of file 106 and the time when it was modified/created.

Central database server 118 may be organized by identifiers and timestamps. Rules creator 120 may retrieve the information in central database server 118 and align the data acquired from malware scanner 114 and proactive defense module 108. For example, rules creator 120 may select a period of time (e.g., Monday between 3:00 pm and 3:15 pm) and retrieve all activity that was reported as occurring during the period of time. Rules creator 120 may then determine whether an identifier reported by malware scanner 114 matches an identifier reported by proactive defense module 108. For example, if script 104 was executed in the time period mentioned above, rules creator 120 may retrieve a first report from malware scanner 114 that mentions the name of file 106 (due to the detection of malicious code) and a second report from proactive defense module 108 that mentions the name of file 106 as well (due to the creation of file 106 by an operation of script 104). In response to determining that the identifiers match, rules creator 120 may generate a regular expression rule (e.g., in a text file). Referring to the queue of operations shown above, rules creator 120 may indicate in the rule that the following queue of operations is associated with malicious activity:

| f | a\d+,\d+ | b | s | s | a\d+,\d+ | f | e | s | a\d+,\d+ |
|---|---|---|---|---|---|---|---|---|---|

This rule comprises regular expressions that are each made up of a sequence of characters that define a search pattern. Thus, instead of "a10, 20," the regular expression "a\d+, d\+" enables a broader search. If an operation comprises any numbers (even if they are not 10 and 20 of the original operation), it will still fit into the regular expression. For example, "a\d+,\d+" also includes "a34, 2." At any given time, rules creator 120 may detect multiple matches of malicious files and script executions. Accordingly, rules creator 120 may generate a plurality of rules for a given period of time. Rules creator 120 may then generate a file that lists all of the generated rules. The file may further indicate an identifier of each script that created a malicious file, including script 104 responsible for creating malicious file 106. In some aspects, the rules are specific to a computing device (e.g., device 102). For example, the rules may not be applied to other computing devices (e.g., servers) to reduce the likelihood of false positives.

The file comprising the list of new rules is delivered to rules compilation module 112, which compiles a list of signatures by converting the rules from text format to binary format (e.g., compiled into binary file(s)). Each signature is stored in a separate file. Rules compilation module 112 may name each file based on a SHA256 hash of the path of the script. For example, rules compilation module may determine a hash of the path of script 104 by executing:

SHA256_CTX ctx;
SHA256_Init(&ctx);
SHA256_Update(&ctx, script, strlen(script)+1);
SHA256_Final(hash, &ctx);

In some aspects, proactive defense module 108, when executed by a script interpreter, determines the name of the currently executing script and loads only a set of signatures specific only to this script (based on the grouping in rules 110). This saves computational resources such as the memory of computing device 102.

Figure 3:
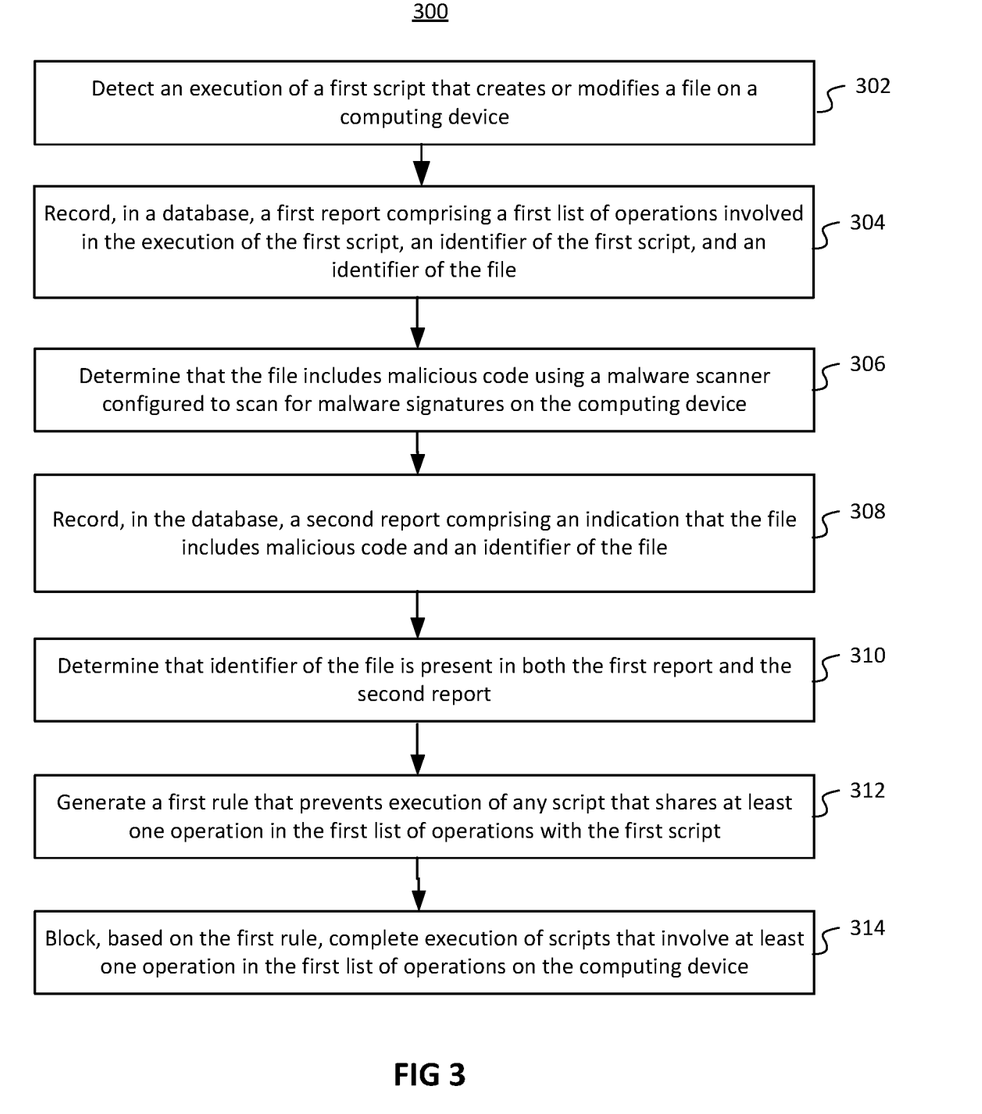
FIG. 3 illustrates a flow diagram of a method for blocking malicious script execution.

FIG. 3 illustrates a flow diagram of method 300 for blocking malicious script execution. At 302, proactive defense module 108 detects an execution of script 104 that creates or modifies file 106 on computing device 102. In some aspects, script 104 is a PHP script. It should be noted that script 104 may create or modify a plurality of files including file 106. Prior to the execution of script 104, proactive defense module 108 may determine whether to enable its execution. For example, proactive defense module 108 may determine whether a rule exists in the rules database (e.g., rules 110) indicating that the first script should be blocked, and enabling execution of the first script in response to determining that the rule does not exist in the rules database.

At 304, proactive defense module 108 records, in a database (e.g., central database server 118), a first report comprising a first list of operations involved in the execution of the first script, an identifier of the script 104, and an identifier of file 106 (or any other file created/modified). At 306, malware scanner 114 determines that file 106 (and/or any other file created/modified) includes malicious code, wherein malware scanner 114 is configured to scan (in some aspects, periodically) for malware signatures on computing device 102. At 308, malware scanner 114 record, in central database server 118, a second report comprising an indication that file 106 includes malicious code and an identifier of file 106.

At 310, rule creator 120 determines that identifier of file 106 (and/or any other file created/modified) is present in both the first report and the second report. In some aspects, each report includes timestamps that rule creator 120 aligns. For example, the first report includes timestamps of operations (e.g., 3:00 pm, 3:05 pm, 3:06 pm, 3:09 pm) and the second report includes a timestamp of when file 106 was created or modified (e.g., 3:06 pm). Rule creator 120 may determine a time period spanning the timestamps (e.g., 3:00 pm to 3:09 pm) of the list of operations and then determine that the first report should be compared to the second report in response to determining that the timestamp of when file 106 was created or modified occurs within the time period.

At 312, rule creator 120 generates a first rule that prevents execution of any script that shares at least one operation in the first list of operations with the first script. In some aspects, the first rule also accounts for modified versions of the list of operations to block. At 314, proactive defense module 108 blocks, based on the first rule, complete execution of scripts that involve at least one operation in the first list of operations on computing device 102. This is further described in FIG. 4.

Figure 4:
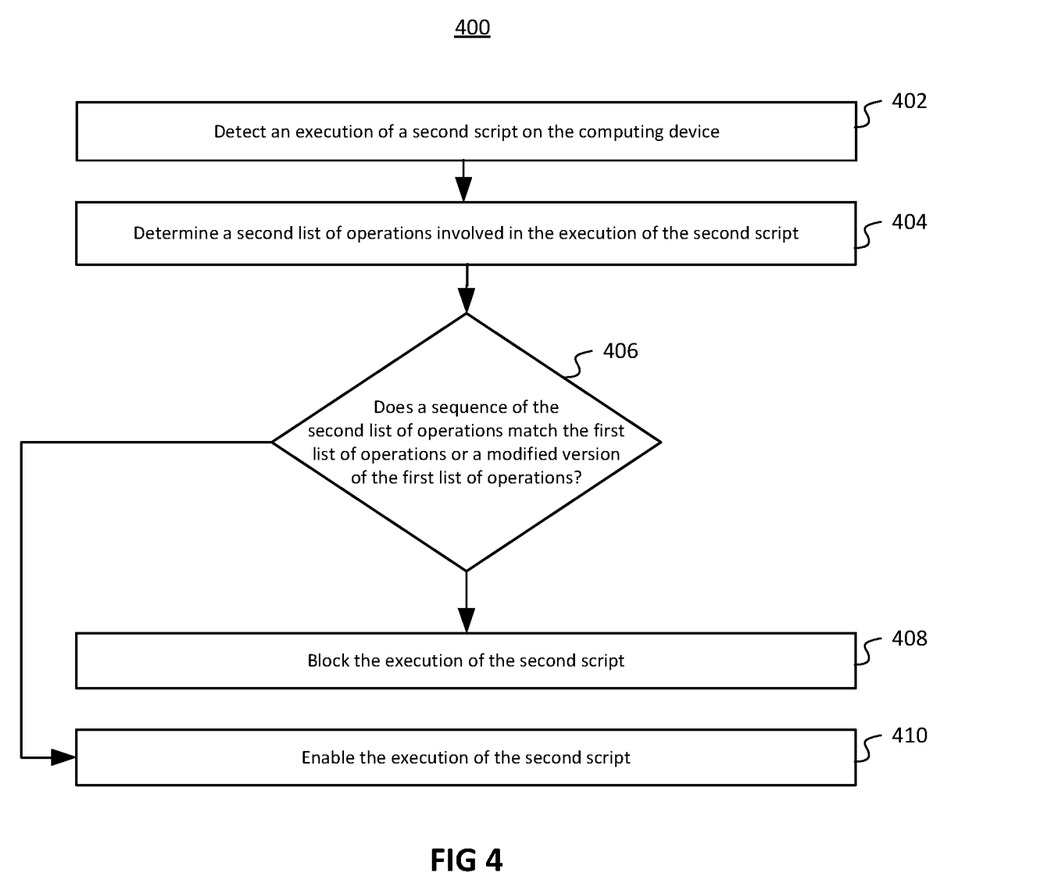
FIG. 4 illustrates a flow diagram of a method for comparing operations of a suspected script to existing rules.

FIG. 4 illustrates a flow diagram of method 400 for comparing operations of a suspected script to existing rules. At 402, proactive defense module 108 detects an execution of a second script on computing device 102. The script may be titled "uploader.php" and may be in a directory addressed "/home/rrr/." The contents of the script may be

```
<?php
echo "Start script\n";
sleep(1);
$a="WDVPIVAIQEFQaaaWzRcUFpYNTQoUF4pN0NDKTd9JEaaaVJQ0FSLVNUQU5EQV
JELUFOVEaaalWSVJVUy1URVNULUZJTEUhJEgrSCo=";
$b=str_replace("aaa",$a);
```

```
$i=0;
while($i<3){
  sleep(1);
  $i++;
  echo "$i\n";
}
$c=base64_decode($b);
$res = file_put_contents("/home/rrr/test1.virus", $c);
var_dump($res);
```

As can be seen by the command "file_put_contents," the script creates a malicious file "test1.virus" in the directory "rrr." At 404, proactive defense module 108 determines a second list of operations involved in the execution of the second script. In the context of the present disclosure, a complete execution of a script occurs when a file is created or when modifications to an existing file are written. More specifically, proactive defense module 108 blocks operations referred to by the letter "f." Such operations will write, put contents in, move files, etc. While other operations may replace strings, for example, the changes are not finalized until the file is written. Suppose that the second list of operations associated with a complete execution of the script "uploader.php" is

| f | o | a3,1 | s | a2,2 | f |
|---|---|------|---|------|---|

Proactive defense module 108 may execute one operation at a time until the final "f." Before completing execution of the script by executing "f," proactive defense module 108 may compare the second list of operations with signatures in rules 110.

At 406, proactive defense module 108 determines whether a sequence of the second list of operations matches the first list of operations or a modified version of the first list of operations in the rules database. For example, if there are 6 operations, proactive defense module 108 may determine whether at 5 of the operations match and are in the same order. In some aspects, the threshold number of operations that need to match is adjustable (e.g., by a user) to improve the accuracy of the system and prevent false positives. For example, a rule in rules 110 with the first list of operations may be:
rule:
id: 80000
description: Auto Immunity rule
detection:

| f | o | a\d+,\d+\ | | s | a\d+,\d+\ | | f |
|---|---|-----------|---|---|-----------|---|---| script: /home/rrr/uploader.php

If the sequences match, method 400 advances to 408, where proactive defense module 108 blocks the execution of the second script. If the sequences do not match, method 400 advances to 410, where proactive defense module 108 enables the execution of the second script.

As there may be several thousand rules in rules 110, proactive defense module 108 may minimize the search based on the hash of the scripts address. As discussed before, proactive defense module 108 may determine the hash of, for example, "/home/rrr/uploader.php" and search for that hash value in rules 110. In response to finding the hash value in rules 110, proactive defense module 108 may execute method 400.

In some aspects, if a signature in rules 110 is not detected over a certain period of time (e.g., 1 year), the signature is removed from rules 110 by proactive defense module 108. This removal is performed to save storage and reduce processing (when comparing a detected execution flow against the signatures in rules 110 as there are fewer signatures to compare with).

In some rare instances, a user may generate a file that shares the name with a malicious script and has a similar execution flow. Proactive defense module 108 may block the complete execution of the file despite the file being safe. In such cases, a user may place the file in a white list of proactive defense module to avoid false positives and enable execution of the file.

Figure 5:
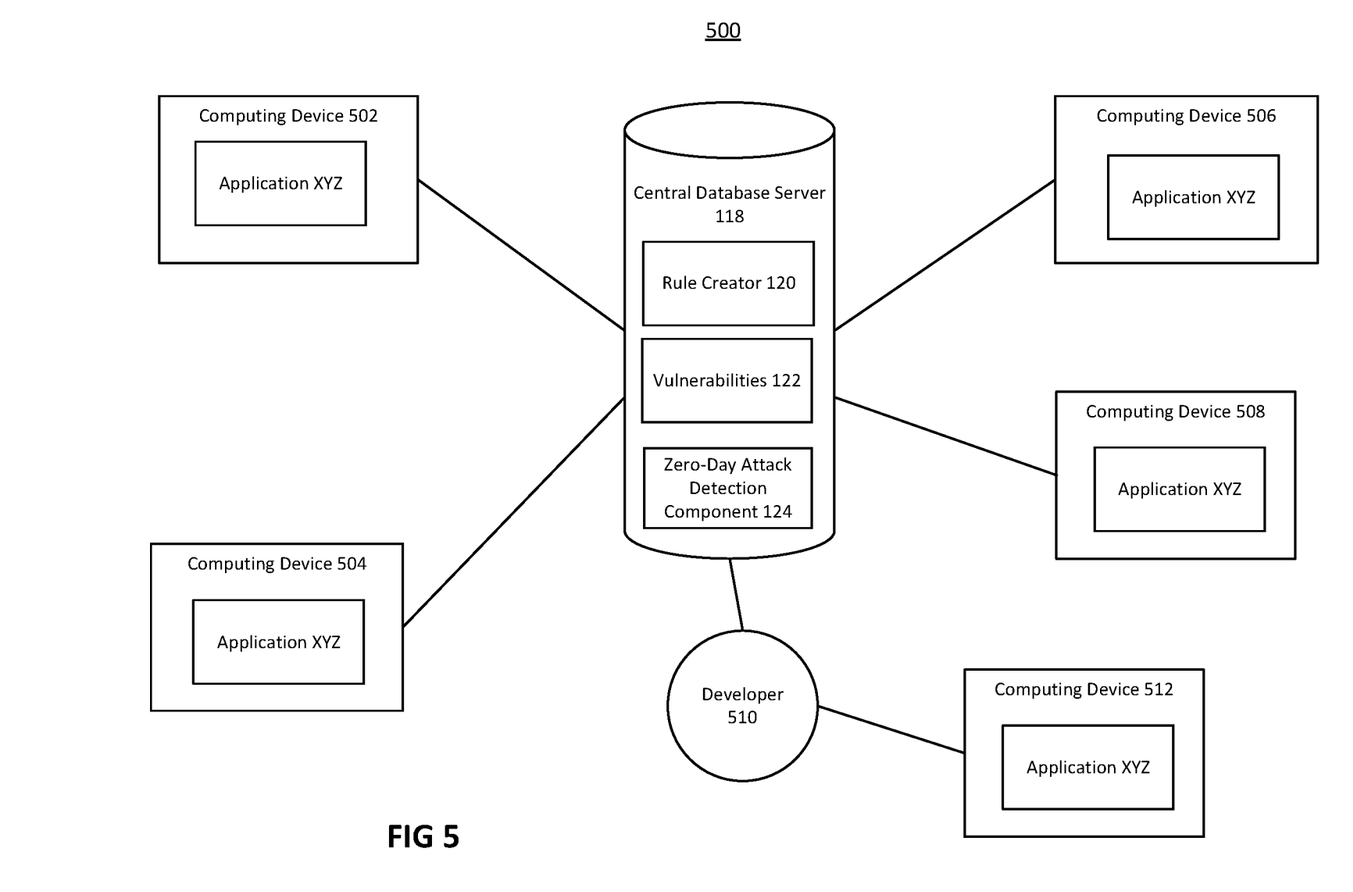
FIG. 5 is a block diagram illustrating a system for monitoring vulnerability exploitation over a plurality of computing devices.

FIG. 5 is a block diagram illustrating system 500 for monitoring vulnerability exploitation over a plurality of computing devices. In system 500, computing devices 502, 504, 506, and 508 are connected to central database server 118. Each computing device may have application XYZ installed (continuing from the overarching example of Application XYZ and versions 1.11 and 1.12). Application XYZ may be developed by developer 510. Suppose that computing device 502 is computing device 102 and application XYZ is application 103.

In some aspects, there may be no Web Application Firewall (WAF) rule for the vulnerability. For example, the WAF may be the first line of protection and in case the event was observed by proactive defense module 108 (e.g., the second line of protection), there may be no WAF rule for the vulnerability.

Rule creator 120 may generate a rule based on the correlation of information from proactive defense module 108 and malware scanner 114. Subsequent to the generation of the rule, proactive defense module 108 will be able to defend against the malicious behavior of script 104 in application 103. Furthermore, the rule creator 120 may transmit the rule to each of computing device 504, 506, and 508 despite the malicious behavior not yet being detected on those devices. This is an active approach to defending against threats.

Zero-day attack detection component 124 may then determine whether a vulnerability associated with the signature in the created rule is in the data structure, vulnerabilities 122. If the vulnerability is not found, zero-day attack detection component 124 may generate a zero-day vulnerability entry in vulnerabilities 122 and increment a vulnerability count for the entry. Zero-day attack detection component 124 may subsequently monitor for employment of the created rule. For example, script 104 may be detected on computing device 506 by the created rule. Proactive defense module 108 on computing device 506 may report the employment to central database server 118. In response to detecting that the rule was employed and script 104 was blocked from executing, zero-day attack detection component 124 may determine whether the vulnerability exists in vulnerabilities 122. In response to determining that vulnerability exists (i.e., as a zero-day vulnerability), the vulnerability count is incremented by component 124. Zero-day attack detection component 124 may then determine whether the vulnerability count exceeds a threshold vulnerability count.

In response to determining that the vulnerability count exceeds the threshold vulnerability count, zero-day attack detection component 124 transmits an alert to developer 510. The alert may include an indication of the zero-day vulnerability, the vulnerability count, and information about the computing devices that executed the rule (e.g., hardware and software attributes). The alert may also include information about the attacks (e.g., when detected, script name, modified file name, how the application script execution was initiated etc.) on each computing device. In some aspects, the alert may also include a request for a patch that resolves the vulnerability. Zero-day attack detection component 124 may receive a receipt confirmation message from developer 510 and in response, may change the vulnerability type from "zero-day vulnerability" to "known vulnerability."

It should be noted that although proactive defense module 108 is able to defend against the zero-day attack on all computing devices of system 500 after it has been detected on computing device 502, reporting the zero-day vulnerability of application XYZ to developer 510 is important as it helps defend computing devices that do not have proactive defense module 108. The best preventative approach involves improving application code. If computing device 512 has application XYZ, but does not have proactive defense module 108, it is vulnerable to the zero-day attack. However, if the zero-day vulnerability is reported to developer 510 and developer 510 releases a corrective patch, computing device 512 is indirectly protected.

It should also be noted that some vulnerabilities are specific to a computing device and are not directly due to an application's vulnerability. In this case, multiple computing devices may not implement a created rule (e.g., more than the threshold vulnerability count). In some aspects, zero-day attack detection component 124 will not report the vulnerability to developer 510 as it may simply be a false positive. Determining whether to report the zero-day vulnerability to developer 510 is thus based on how many times the vulnerability is found on different computing devices. In some cases, zero-day attack detection component 124 may not use this collaborative approach if developer 510 requests immediate alerts about any potential vulnerabilities. For example, developer 510 may want to self-evaluate whether the zero-day vulnerability is an actual vulnerability and may not elect to wait for the alert until the threshold vulnerability count for the zero-day vulnerability is exceeded.

In general, zero-day attack detection component 124 may track employment of the first rule and generate statistics on similar vulnerabilities events for ranking the ongoing vulnerabilities exploitations. Thus if multiple vulnerabilities are detected, zero-day attack detection component 124 can inform the developer how to prioritize the rollout of patches based on the vulnerabilities that are most commonly detected (i.e., first release a patch for a vulnerability that is detected on 80% of computing devices and then release a patch for a vulnerability that is detected on only 20% of computing devices).

Figure 6:
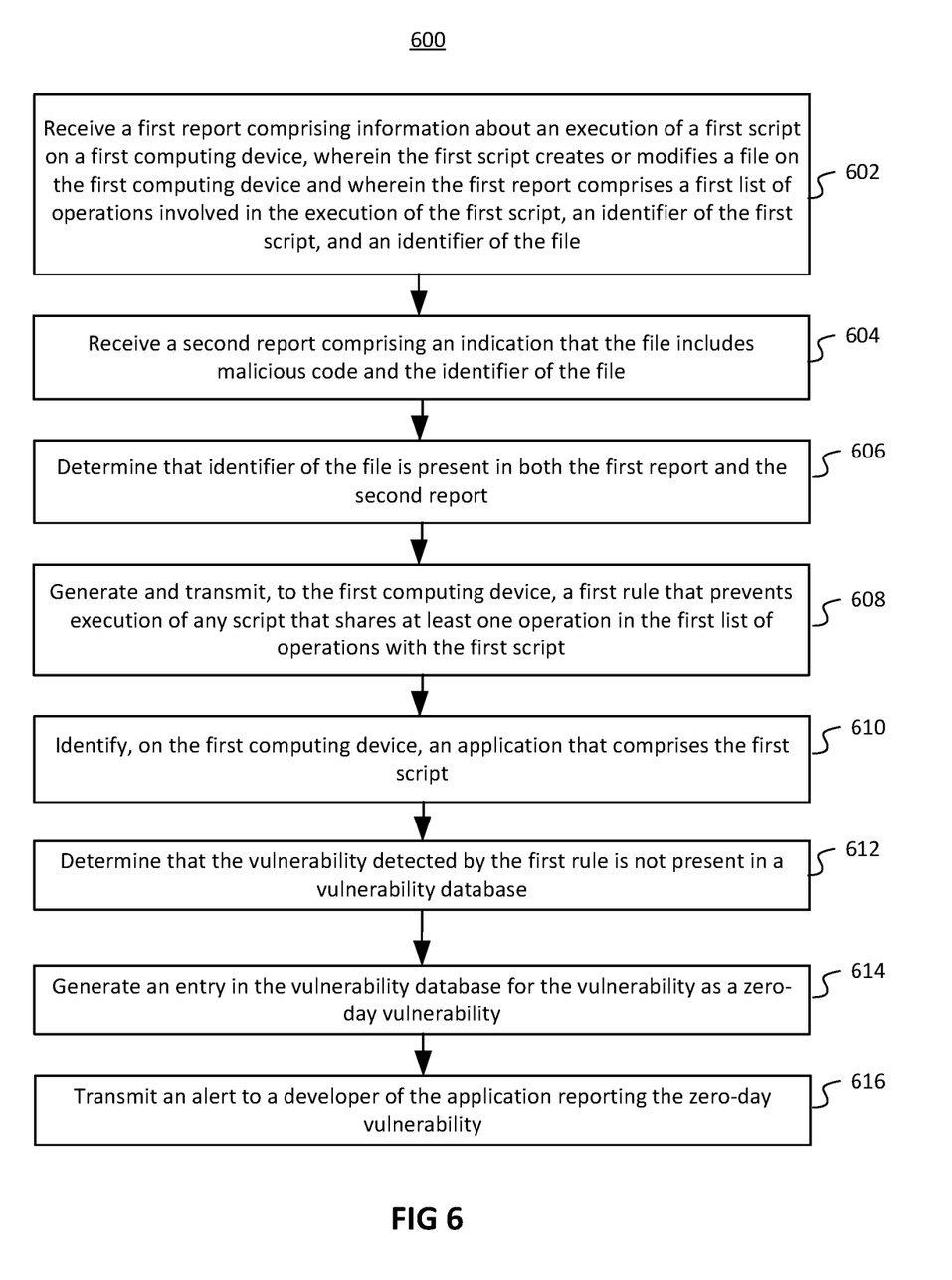
FIG. 6 illustrates a flow diagram of a method for preventing zero-day attacks.

FIG. 6 illustrates a flow diagram of method 600 for preventing zero-day attacks. At 602, rule creator 120 receives a first report comprising information about an execution of a first script (e.g., script 104) on a first computing device (e.g., computing device 102), wherein the first script creates or modifies a file (e.g., file 106) on the first computing device and wherein the first report comprises a first list of operations involved in the execution of the first script, an identifier of the first script, and an identifier of the file. At 604, rule creator 120 receives a second report comprising an indication that the file includes malicious code and the identifier of the file. At 606, rule creator 120 determines that identifier of the file is present in both the first report and the second report. At 608, rule creator 120 generates and transmits, to the first computing device, a first rule that prevents execution of any script that shares at least one operation in the first list of operations with the first script.

At 610, zero-day attack detection component 124 identifies, on the first computing device, an application (e.g., application 103) that comprises the first script. At 612, zero-day attack detection component 124 determines that a vulnerability detected by the first rule is not present in a vulnerability database (e.g., vulnerabilities 122). At 614, zero-day attack detection component 124 generates an entry in the vulnerability database for the vulnerability as a zero-day vulnerability. At 616, zero-day attack detection component 124 transmits an alert to a developer (e.g., developer 510) of the application reporting the zero-day vulnerability.

Figure 7:
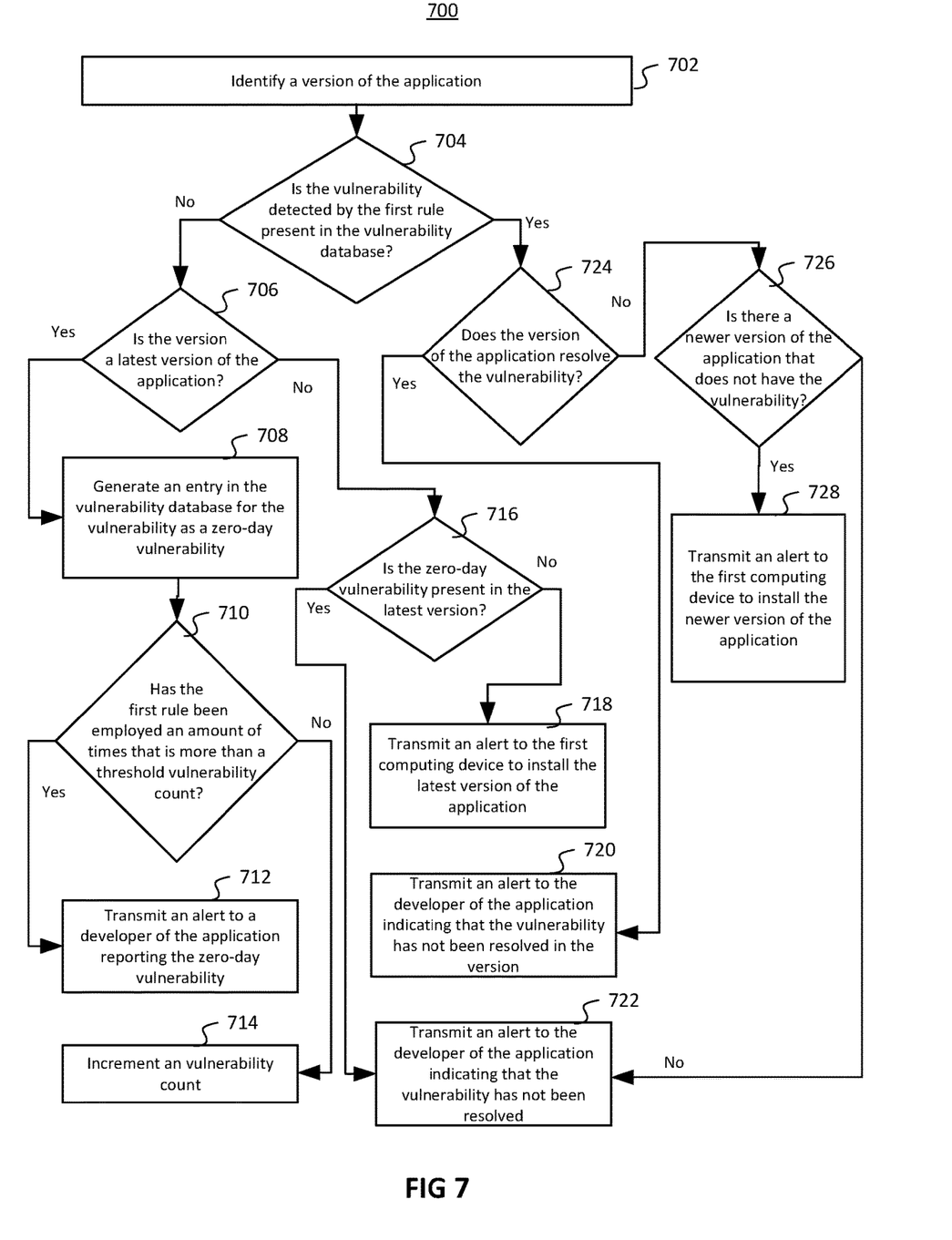
FIG. 7 illustrates a flow diagram of a method for identifying a type of vulnerability.

FIG. 7 illustrates a flow diagram of method 700 for identifying a type of vulnerability. At 702, zero-day attack detection component 124 identifies a version of the application (e.g., version 1.12 of application XYZ). At 704, zero-day attack detection component 124 determines if the vulnerability detected by the first rule is present in the vulnerability database. In response to determining that the vulnerability is not in the vulnerability database, method 700 advances to 706, where zero-day attack detection component 124 determines whether the version of the application is a latest version of the application. For example, according to the vulnerability database, the latest version of application XYZ may be version 1.12.

In response to determining that the identified version is the latest version, method 700 advances to 708, where zero-day attack detection component 124 generate an entry in the vulnerability database for the vulnerability as a zero-day vulnerability. At 710, zero-day attack detection component 124 determines whether the first rule has been employed an amount of times (i.e., a vulnerability count) across a plurality of computing devices that is more than a threshold vulnerability count. In response to determining that the vulnerability count exceeds the threshold vulnerability count, method 700 advances to 712, where zero-day attack detection component 124 transmits an alert to a developer of the application reporting the zero-day vulnerability. If the vulnerability count does not exceed the threshold vulnerability count, method 700 advances to 714, where zero-day attack detection component 124 simply increments the vulnerability count.

At 706, if zero-day attack detection component 124 determines that the identified version is not the latest version, method 700 advances to 716, where zero-day attack detection component 124 determines whether the vulnerability is present in the latest version (e.g., checks if the first rule is applicable to an application of the latest version). In response to determining that the vulnerability is not present in the latest version, method 700 advances to 718, where zero-day attack detection component 124 transmits an alert to the first computing device to install the latest version of the application. If at 716 zero-day attack detection component 124 determines that the zero-day vulnerability is present in the latest version, method 700 advances to 722, where zero-day attack detection component 124 transmits an alert to the developer of the application indicating that the vulnerability has not been resolved.

If at 704 zero-day attack detection component 124 determines that the vulnerability is in the vulnerability database, method 700 advances to 724, where zero-day attack detection component 124 determines whether the identified version of the application resolves the vulnerability according to the vulnerability database. In response to determining that the vulnerability database indicates that the identified version resolves the vulnerability, method 700 advances to 720, where zero-day attack detection component 124 transmits an alert to the developer of the application indicating that the vulnerability has not been resolved in the version. Referring to the table of vulnerabilities 122 described previously, for example, zero-day attack detection component 124 may determine that version 1.12 of application XYZ still has a vulnerability in which an fwrite function is maliciously modifying file 106. According to vulnerabilities 122, the vulnerability has been resolved in version 1.12. However, if the vulnerability is still present in version 1.12, zero-day attack detection component 124 determines that the vulnerability is unprotected. An unprotected vulnerability represents a vulnerability that has not been successfully resolved by the developer.

At 724, if the vulnerabilities database does not include an indication that the version of the application resolves the vulnerability, method 700 advances to 726, where zero-day attack detection component 124 determines whether a newer version of the application exists that does not have the vulnerability. In response to determining that there is, method 700 advances to 728, where zero-day attack detection component 124 transmits an alert to the first computing device to install the newer version of the application. Otherwise, method 700 advances to 722.

Figure 8:
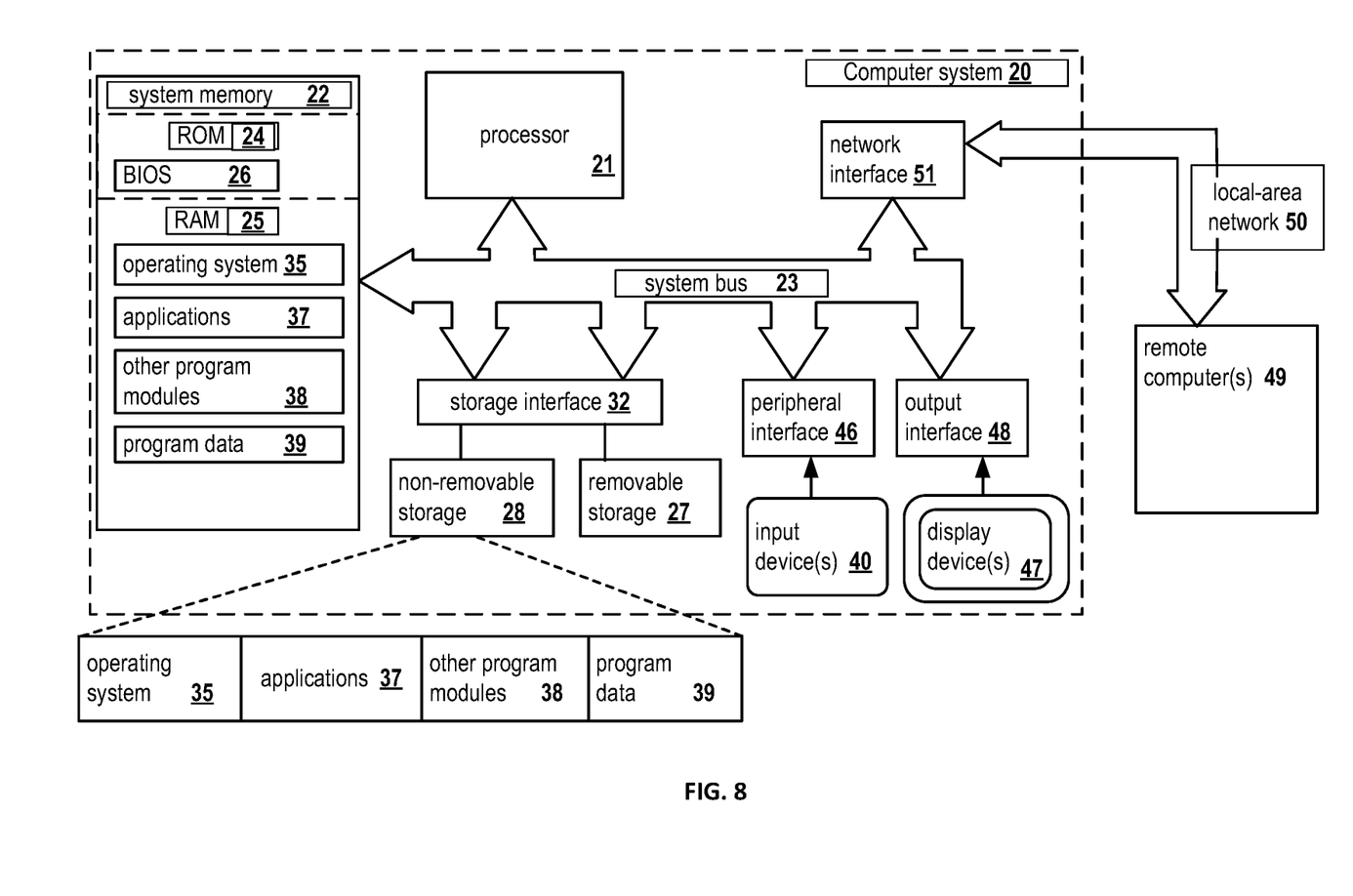
FIG. 8 presents an example of a general-purpose computer system on which aspects of the present disclosure can be implemented.

FIG. 8 is a block diagram illustrating a computer system 20 on which aspects of systems and methods for blocking malicious script execution and preventing zero-day attacks may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21.

The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preventing zero-day attacks, the method comprising:
receiving a first report comprising information about an execution of a first script on a first computing device, wherein the first script creates or modifies a file on the first computing device and wherein the first report comprises a first list of operations involved in the execution of the first script, an identifier of the first script, and an identifier of the file;
receiving a second report comprising an indication that the file includes malicious code and the identifier of the file;
in response to determining that identifier of the file is present in both the first report and the second report, generating and transmitting, to the first computing device, a first rule that prevents execution of any script that shares at least one operation in the first list of operations with the first script;

identifying, on the first computing device, an application that comprises the first script;
determining whether a vulnerability detected by the first rule is present in a vulnerability database;
in response to determining that the vulnerability is not present in the vulnerability database, generating an entry in the vulnerability database for the vulnerability as a zero-day vulnerability; and
transmitting an alert to a developer of the application reporting the zero-day vulnerability.

2. The method of claim 1, wherein the alert requests a patch to fix the zero-day vulnerability.

3. The method of claim 2, further comprising:
receiving, from the developer, the patch that resolves the zero-day vulnerability in the application;
updating the entry in the vulnerability database to indicate a version identifier of the application that resolves the zero-day vulnerability.

4. The method of claim 1, further comprising:
identifying a version of the application;
determining whether the version is a latest version of the application;
in response to determining that the version is not the latest version, determining whether the zero-day vulnerability is present in the latest version of the application; and
in response to determining that the zero-day vulnerability is not present in the latest version, transmitting an alert to the first computing device to install the latest version of the application.

5. The method of claim 4, wherein determining whether the zero-day vulnerability is present in the latest version comprises:
determining whether the zero-day vulnerability is detected using the first rule on the latest version of the application.

6. The method of claim 1, further comprising:
in response to determining that the vulnerability is present in the vulnerability database, identifying a version of the application installed on the first computing device; and
in response to determining that the vulnerability database indicates that the version of the application resolves the vulnerability, transmitting an alert to the developer of the application indicating that the vulnerability has not been resolved in the version.

7. The method of claim 6, further comprising:
in response to determining that the vulnerability database indicates that the version of the application does not resolve the vulnerability, identifying a newer version of the application that does not have the vulnerability; and
transmitting an alert to the first computing device to install the newer version of the application.

8. The method of claim 1, further comprising:
transmitting the first rule to a plurality of computing devices including the first computing device;
monitoring an amount of times the vulnerability is detected using the first rule across the plurality of computing devices;
wherein transmitting the alert to the developer of the application reporting the zero-day vulnerability is in response to determining that the amount of times exceeds a threshold vulnerability count.

9. The method of claim 1, wherein the first computing device is configured to block, based on the first rule, complete execution of scripts that involve at least one operation in the first list of operations on the first computing device.

10. The method of claim 1, wherein the first script is a PHP script.

11. A system for blocking malicious script execution, the system comprising:
a memory; and
a hardware processor communicatively coupled with the memory and configured to:
receive a first report comprising information about an execution of a first script on a first computing device, wherein the first script creates or modifies a file on the first computing device and wherein the first report comprises a first list of operations involved in the execution of the first script, an identifier of the first script, and an identifier of the file;
receive a second report comprising an indication that the file includes malicious code and the identifier of the file;
in response to determining that identifier of the file is present in both the first report and the second report, generate and transmit, to the first computing device, a first rule that prevents execution of any script that shares at least one operation in the first list of operations with the first script;
identify, on the first computing device, an application that comprises the first script;
determine whether a vulnerability detected by the first rule is present in a vulnerability database;
in response to determining that the vulnerability is not present in the vulnerability database, generate an entry in the vulnerability database for the vulnerability as a zero-day vulnerability; and
transmit an alert to a developer of the application reporting the zero-day vulnerability.

12. The system of claim 11, wherein the alert requests a patch to fix the zero-day vulnerability.

13. The system of claim 12, wherein the hardware processor is further configured to:
receive, from the developer, the patch that resolves the zero-day vulnerability in the application;
update the entry in the vulnerability database to indicate a version identifier of the application that resolves the zero-day vulnerability.

14. The system of claim 11, wherein the hardware processor is further configured to:
identify a version of the application;
determine whether the version is a latest version of the application;
in response to determining that the version is not the latest version, determine whether the zero-day vulnerability is present in the latest version of the application; and
in response to determining that the zero-day vulnerability is not present in the latest version, transmit an alert to the first computing device to install the latest version of the application.

15. The system of claim 14, wherein the hardware processor is further configured to determine whether the zero-day vulnerability is present in the latest version by:
determining whether the zero-day vulnerability is detected using the first rule on the latest version of the application.

16. The system of claim 11, wherein the hardware processor is further configured to:
in response to determining that the vulnerability is present in the vulnerability database, identify a version of the application installed on the first computing device; and
in response to determining that the vulnerability database indicates that the version of the application resolves the vulnerability, transmit an alert to the developer of the application indicating that the vulnerability has not been resolved in the version.

17. The system of claim 16, wherein the hardware processor is further configured to:
in response to determining that the vulnerability database indicates that the version of the application does not resolve the vulnerability, identify a newer version of the application that does not have the vulnerability; and
transmit an alert to the first computing device to install the newer version of the application.

18. The system of claim 11, wherein the hardware processor is further configured to:
transmit the first rule to a plurality of computing devices including the first computing device;
monitor an amount of times the vulnerability is detected using the first rule across the plurality of computing devices;
wherein transmitting the alert to the developer of the application reporting the zero-day vulnerability is in response to determining that the amount of times exceeds a threshold vulnerability count.

19. The system of claim 11, wherein the first computing device is configured to block, based on the first rule, complete execution of scripts that involve at least one operation in the first list of operations on the first computing device.

20. A non-transitory computer readable medium storing thereon computer executable instructions for preventing zero-day attacks, including instructions for:

receiving a first report comprising information about an execution of a first script on a first computing device, wherein the first script creates or modifies a file on the first computing device and wherein the first report comprises a first list of operations involved in the execution of the first script, an identifier of the first script, and an identifier of the file;

receiving a second report comprising an indication that the file includes malicious code and the identifier of the file;

in response to determining that identifier of the file is present in both the first report and the second report, generating and transmitting, to the first computing device, a first rule that prevents execution of any script that shares at least one operation in the first list of operations with the first script;

identifying, on the first computing device, an application that comprises the first script;

determining whether a vulnerability detected by the first rule is present in a vulnerability database;

in response to determining that the vulnerability is not present in the vulnerability database, generating an entry in the vulnerability database for the vulnerability as a zero-day vulnerability; and transmitting an alert to a developer of the application reporting the zero-day vulnerability.

* * * * *